United States Patent
Wei

(10) Patent No.: US 10,989,891 B2
(45) Date of Patent: Apr. 27, 2021

(54) OPTICAL LENS

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 47 days.

(21) Appl. No.: 16/528,688

(22) Filed: Aug. 1, 2019

(65) Prior Publication Data

US 2020/0049924 A1 Feb. 13, 2020

(30) Foreign Application Priority Data

Aug. 9, 2018 (CN) .......................... 201821279582.1

(51) Int. Cl.
*G02B 3/08* (2006.01)
*G02B 7/02* (2021.01)

(52) U.S. Cl.
CPC ...................................... *G02B 7/02* (2013.01)

(58) Field of Classification Search
CPC ....... G02B 7/02; G02B 3/08; B29D 11/00942
See application file for complete search history.

(56) References Cited

U.S. PATENT DOCUMENTS 5,905,599 A * 5/1999 Nomura .................... G02B 7/02
359/819
2010/0002315 A1* 1/2010 Kuwa .............. B29D 11/00432
359/811

* cited by examiner

*Primary Examiner* — Stephone B Allen
*Assistant Examiner* — Matthew Y Lee
(74) *Attorney, Agent, or Firm* — W&G Law Group LLP

(57) ABSTRACT

An optical lens, including: an optical portion located at a central position; and a peripheral portion surrounding the optical portion. The peripheral portion includes: a first surrounding portion connected to the optical portion and surrounding the optical portion; and a second surrounding portion surrounding the first surrounding portion and having a lens cutting surface. A thickness of the first surrounding portion in a direction of an optical axis of the optical lens is greater than a thickness of the second surrounding portion in the direction of the optical axis of the optical lens, and the lens cutting surface extends from an object side of the second surrounding portion to an image side of the second surrounding portion along the direction of the optical axis. The optical lens disclosed in the present disclosure has an advantage of preventing internal cracking of the optical lens when the optical lens is cut.

4 Claims, 2 Drawing Sheets

OPTICAL LENS

TECHNICAL FIELD

The present disclosure relates to the field of optical imaging technologies, and in particular, to an optical lens.

BACKGROUND

Most of the current lenses are made of glass or plastic materials. Production of glass lenses must include processes such as grinding etc., and have a high cost. On the contrast, plastic lenses have a low cost, thus, electronic products commonly seen in the current market such as digital cameras and spectacles, are all adopting plastic lenses. In the prior art, plastic lenses are usually manufactured by injection molding, that is, a light-transmitting material is melted in an injection molding die and then injection-molded. In order to improve an efficiency thereof, the existing molding die generally has a plurality of interconnected mold cavities, and a plurality of lenses can be molded at the same time in the plurality of mold cavities. Here, the plurality of cavities is connected by a sprue head and a runner head. After the lenses are molded, they are conveyed to a cutting area together with the sprue head and the runner head, so as to be separated from the sprue head and the runner head by cutting.

However, the inventors of the present disclosure have found that when the lens in the prior art is cut, the lens is prone to cracking during the cutting process due to a large thickness of the lens, resulting in damage of the lens and thus causing loss.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
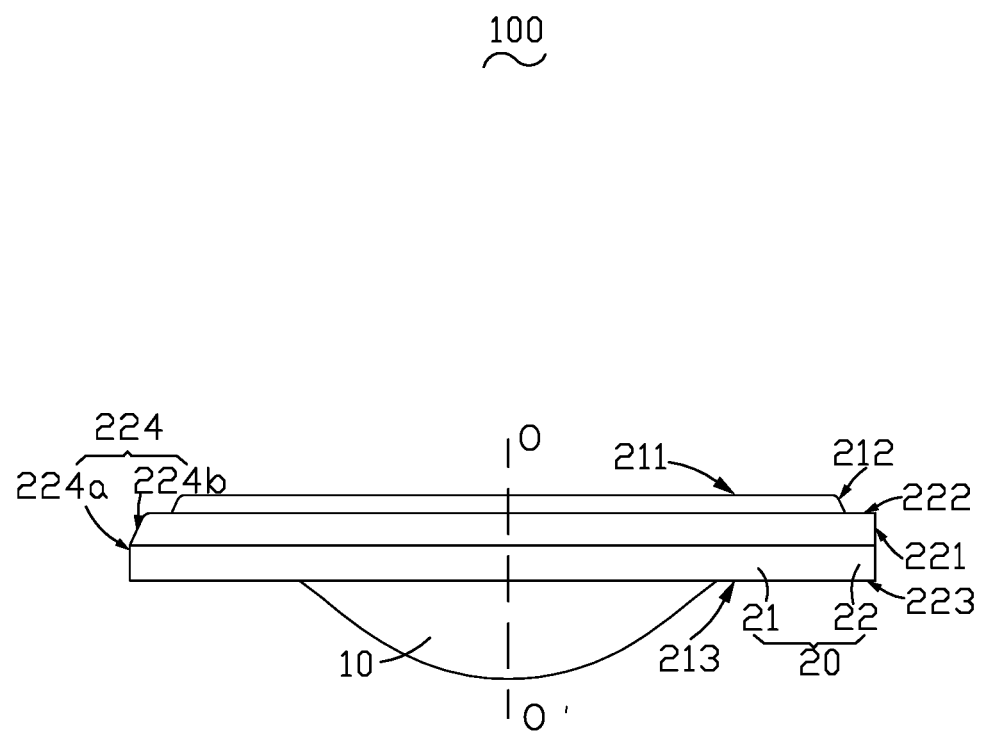
FIG. 1 is a cross-sectional view of an optical lens according to a first embodiment of the present disclosure.
Figure 2:
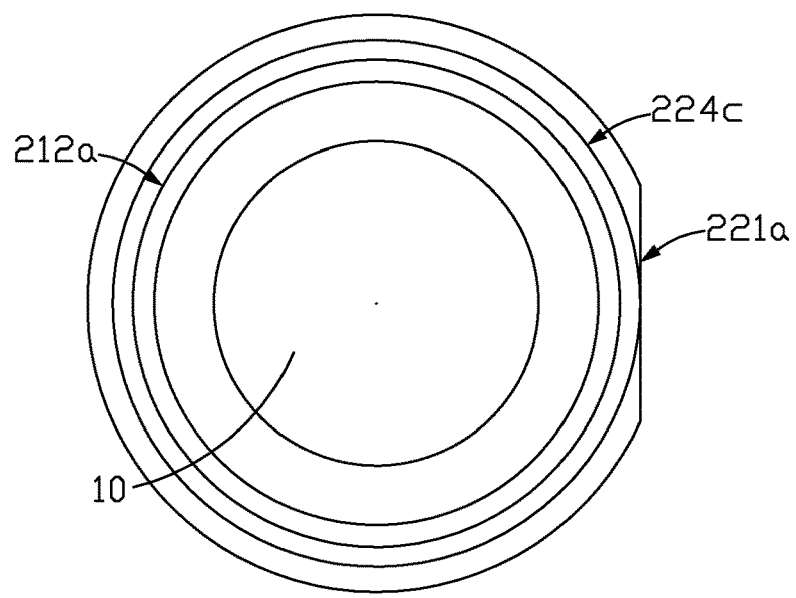
FIG. 2 is a top view of the optical lens along an optical axis direction according to the first embodiment of the present disclosure.

A first embodiment of the present disclosure relates to an optical lens 100. As shown in FIG. 1, the optical lens 100 includes an optical portion 10 located at a central position, and a peripheral portion 20 surrounding the optical portion 10. The peripheral portion 20 includes a first surrounding portion 21 and a second surrounding portion 22. The first surrounding portion 21 is connected to the optical portion 10 and surrounds the optical portion 10, and the second surrounding portion 22 surrounds the first surrounding portion 21. The second surrounding portion 22 includes a lens cutting surface 221. A thickness of the first surrounding portion 21 in a direction of an optical axis OO' of the lens is greater than a thickness of the second surrounding portion 22 in the direction of the optical axis OO'. The lens cutting surface 221 extends from an object side of the second surrounding portion 22 to an image side of the second surrounding portion 22 along the optical axis OO'.

Compared with the prior art, in the first embodiment of the present disclosure, the optical lens 100 includes the optical portion 10 and the peripheral portion 20, and the peripheral portion 20 includes the first surrounding portion 21 and the second surrounding portion 22. Besides, the second surrounding portion 22 includes a lens cutting surface 221, which is formed at a cutting position after the lens 100 is cut. The lens cutting surface 221 extends from the object side of the second surrounding portion 22 to the image side of the second surrounding portion 22 along the optical axis OO', which indicates that the cutting position of the lens 100 is located at the second surrounding portion 22. Since the thickness of the first surrounding portion 21 in the direction of the optical axis OO' is greater than the thickness of the second surrounding portion 22 in the direction of the optical axis OO', the cutting position of the lens 100 is arranged at the second surrounding portion 22 which is thinner, so that a risk of internal cracking due to a thick lens 100 can be effectively reduced when the lens 100 is cut, thereby effectively reducing inner cracking of the lens. Moreover, after the lens 100 is cut along the lens cutting surface 221, a width of the lens 100 in a direction perpendicular to the optical axis OO' is reduced, thereby reducing space occupied by the lens 100. Thus, when the lens 100 is installed in the lens barrel, a wall thickness of the lens barrel at a corresponding position can be increased, thereby improving strength of the lens module.

Specifically, in this embodiment, the first surrounding portion 21 includes a first surface 211 extending from an edge of the optical portion 10 facing away from the optical axis OO' along a direction facing away from and perpendicular to the optical axis OO', and a second surface 212 extending from an edge of the first surface 211 facing away from the optical axis OO' to the second surrounding portion 22 along a direction facing away from the optical axis OO'. The first surface 211 and the second surface 212 are located at one side of the optical lens 100. The second surrounding portion 22 includes a third surface 222 extending from an edge of the second surface 212 facing away from the optical axis OO' along a direction facing away from and perpendicular to the optical axis OO'.

Further, in this embodiment, a cutting line 221a formed by the lens cutting surface 221 intersecting with the third surface 222 is spaced apart from an edge 212a of the second surface 212 facing away from the optical axis OO'. The cutting line 221a is spaced apart from the edge 212a, which indicates that the cutting position is located at the second surrounding portion 22. It can be understood that a position relationship between the cutting line 221a and the edge 212a is not limited to that the cutting line 221a and the edge 212a are spaced apart from each other, and it is also possible that the cutting line 221a is tangent to the edge 212a, in this case, the cutting position is located at an intersection position where the first surrounding portion 21 intersects with the second surrounding portion 22. The cutting position can be adjusted according to actual needs.

In addition, the first surrounding portion 21 further includes a fourth surface 213, and the fourth surface 213 is located at another side of the lens 100 (i.e., a side opposite to the first surface 211 and the second surface 212) and extends from an edge of the optical portion 10 facing away from the optical axis OO' along the direction facing away from and perpendicular to the optical axis OO'. The second surrounding portion 22 includes a fifth surface 223, and the fifth surface 223 extends from an edge of the fourth surface 213 facing away from the optical portion 10 along the direction facing away from and perpendicular to the optical axis OO'. Since the fifth surface 223 starts from an edge of the fourth surface 213 and extends in the same direction as the fourth surface 213, the fifth surface 223 is flush with the fourth surface 213.

In this embodiment, the second surrounding portion 22 further includes an outer periphery 224 that extends from an edge of the fifth surface 223 facing away from the optical axis OO' to the third surface 222. Specifically, in this embodiment, the outer periphery 224 includes a first peripheral surface 224a extending from the fifth surface along a direction parallel to the optical axis OO', and a second peripheral surface extending from an edge of the first peripheral surface 224a facing away from the fifth surface 223 the third surface 222 along a direction towards the optical axis OO'.

Specifically, in this embodiment, the cutting line 221a is tangent to an edge 224c of the second peripheral surface 224b close to the optical axis OO'.

It should be noted that in the actual production process, there is no absolute parallel or perpendicular structure due to existence of errors. Therefore, the parallel or perpendicular structure defined herein in the embodiments may also be a substantially parallel or perpendicular structure that can achieve the technical effect of the present disclosure.

It should be understood by those skilled in the art that the above embodiments are merely some specific embodiments of the present disclosure, and various changes in form and details may be made without departing from the scope of the present disclosure.

What is claimed is:

1. An optical lens, comprising:
an optical portion located at a central position; and
a peripheral portion surrounding the optical portion, the peripheral portion comprising: a first surrounding portion connected to the optical portion and surrounding the optical portion, and a second surrounding portion surrounding the first surrounding portion and having a lens cutting surface;
wherein a thickness of the first surrounding portion in a direction of an optical axis of the optical lens is greater than a thickness of the second surrounding portion in the direction of the optical axis of the optical lens, and the lens cutting surface extends from an object-side surface of the second surrounding portion to an image-side surface of the second surrounding portion along the direction of the optical axis;
wherein the first surrounding portion comprises a first surface extending from an edge of the optical portion facing away from the optical axis along a direction facing away from and perpendicular to the optical axis, and a second surface extending from an edge of the first surface facing away from the optical axis to the second surrounding portion along a direction facing away from the optical axis; the first surface and the second surface are located at one side of the optical lens, and the second surrounding portion comprises a third surface extending from an edge of the second surface facing away from the optical axis along a direction facing away from and perpendicular to the optical axis;
wherein the first surrounding portion further comprises a fourth surface located at another side of the optical lens and extending from an edge of the optical portion facing away from the optical axis along a direction facing away from and perpendicular to the optical axis, and a fifth surface extending from an edge of the fourth surface facing away from the optical portion along a direction facing away from and perpendicular to the optical axis;
wherein the second surrounding portion further comprises an outer periphery of the optical lens extending from an edge of the fifth surface facing away from the optical axis to the third surface;
wherein the outer periphery comprises a first peripheral surface extending from the fifth surface along a direction parallel to the optical axis, and a second peripheral surface extending from an edge of the first peripheral surface facing away from the fifth surface to the third surface along a direction facing toward the optical axis.

2. The optical lens as described in claim 1, wherein a cutting line formed by the lens cutting surface intersecting with the third surface is tangent to the edge of the second surface facing away from the optical axis.

3. The optical lens as described in claim 1, wherein the cutting line formed by the lens cutting surface intersecting with the third surface is spaced apart from the edge of the second surface facing away from the optical axis.

4. The optical lens as described in claim 1, wherein the cutting line formed by the lens cutting surface intersecting with the third surface is tangent to an edge of the second peripheral surface close to the optical axis.

* * * * *